United States Patent
Mol et al.

[15] 3,661,245
[45] May 9, 1972

[54] ABRASION-RESISTANT CONVEYOR BELT

[72] Inventors: Edward K. Mol, Grand Rapids; Marvin D. Stahl, Belmont, both of Mich.

[73] Assignee: A. J. Sparks & Company, Grand Rapids, Mich.

[22] Filed: June 18, 1969

[21] Appl. No.: 834,418

[52] U.S. Cl. ............................................................198/193
[51] Int. Cl. ..................................................B65g 15/30
[58] Field of Search ..........................................198/193, 198

[56] References Cited

UNITED STATES PATENTS

| | | | |
|---|---|---|---|
| 981,312 | 1/1911 | Robins | 198/193 X |
| 2,745,541 | 5/1956 | Hofstatter | 198/193 X |
| 3,237,754 | 3/1966 | Freitag et al. | 198/193 X |
| 821,121 | 5/1906 | Plummer | 198/193 |

FOREIGN PATENTS OR APPLICATIONS 829,977   4/1964   France....................................198/191

Primary Examiner—Richard E. Aegerter
Assistant Examiner—Douglas D. Watts
Attorney—Glenn B. Morse

[57] ABSTRACT

A conveyor belt with multiple surface areas providing both traction and resistance to abrasion and cutting, and a method of manufacturing the belt.

5 Claims, 7 Drawing Figures

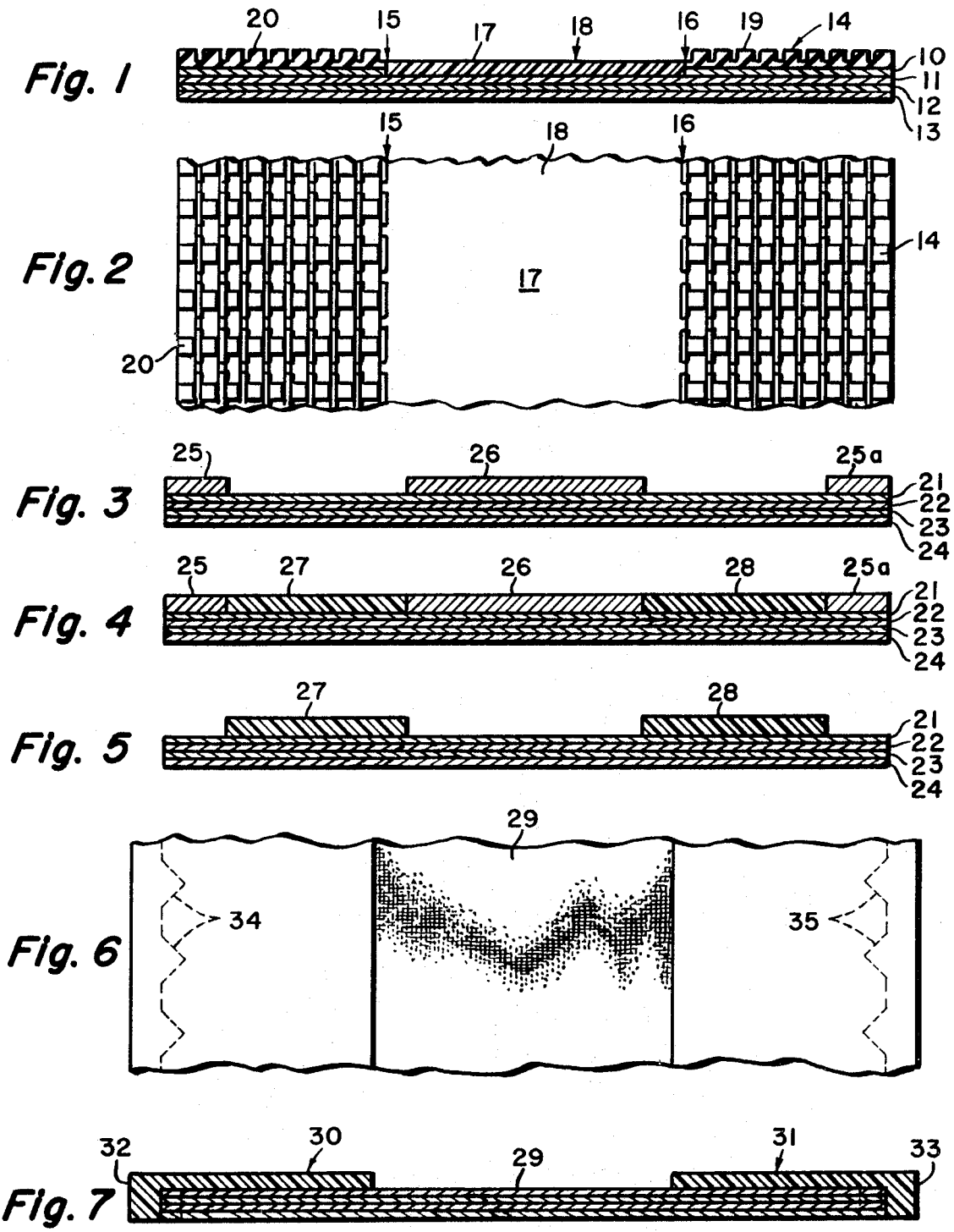
PATENTED MAY 9 1972    3,661,245
INVENTORS
Edward K. Mol
BY Marvin D. Stahl
ATTORNEY

ABRASION-RESISTANT CONVEYOR BELT

BACKGROUND OF THE INVENTION

Conveyor belts are standard items of equipment in manufacturing operations, and are used to carry articles from one manufacturing or assembly station to another. These belts normally have one or more plies of wire or fiber strands for transferring tension, and cover material is normally incorporated for providing relatively high traction and some degree of cushioning effect.

Where articles having sharp edges or corners are dropped on a conveyor belt, an abrasion or cutting action takes place that is usually localized to a particular zonal area or areas determined by the article shape and other surrounding conditions. It is quite likely that an expensive belt will exhibit exaggerated wear at the particular point of impact of such parts, and the belt will show enough localized destruction along a line corresponding to the point of impact to render the belt useless far sooner than would be the case if the effect of the impact abrasion and cutting could be eliminated. The problem becomes acute where fairly heavy castings, or heavy sheet metal pieces emerging from blanking or shearing operations are being handled.

SUMMARY OF THE INVENTION

The present invention provides multiple surfaces on a belt, at least one of which is capable of resisting severe cutting and abrasion. In the preferred form of the invention, this particular surface material is selected for a relatively low coefficient of friction, so that any lateral forces resulting from the dropping of heavy objects on the belt will be reduced to a minimum. Even when an object drops directly on the belt without a lateral trajectory, there will normally be at least some degree of side force involved as the object orients itself from the position in which it first strikes the belt into a final position of rest. Where this orientation can take place against a low coefficient of friction, the resulting lateral forces tending to shift the belt and generate a scuffing action can be reduced. The abrasion-resistant areas of low coefficient of friction are disposed in conjunction with high-traction surfaces extending on at least one side so that the rest position of the articles falling on the belt will be supported in such a manner as to generate sufficient traction to carry the conveyed articles up or down inclines without sliding. The effective coefficient of friction of the traction areas of the belt is a composite of the theoretical coefficient of friction of a smooth piece of anti-friction material (which may be lubricated), together with the effects of a roughened friction surface.

One form of the invention provides an overhang of the abrasion-resistant material beyond the edge of the tension-transmitting portion of the belt, and also a particular configuration of the tension-transmitting portion along this area to increase the security of the abrasion-resistant material. The invention also provides a method of producing the strips of abrasion-resistant surface along the belt by pouring an initially liquid settable material under conditions providing a bond with respect to the tension-transmitting portion. The material is poured in channels defined either by removable rails, or by channels cut into the originally-manufactured face of the belt.

DESCRIPTION OF THE DRAWING

In the drawing,

FIG. 1 is a sectional elevation of a form of belt embodying this invention, in which a central abrasion-resistant area is provided.

FIG. 2 is a plan view of a section of belt of the configuration shown in FIG. 1. FIGS. 1 and 2 are in projection.

FIG. 3 is a sectional elevation showing the preparation of the tension-transmitting portion of a belt for applying a modified form of the invention.

FIG. 4 shows the application of the abrasion-resistant material to the belt as shown prepared in FIG. 3.

FIG. 5 shows the finished modified form of the belt after removal of the confining rails shown present in FIG. 3 and 4.

FIG. 6 illustrates a modified form of the invention in which abrasion-resistant material is installed along the opposite edges of a belt, and overhanging the edges.

FIG. 7 is a sectional elevation of the belt constructed as shown in FIG. 6. FIGS. 6 and 7 are in projection.

DESCRIPTION OF THE PREFERRED EMBODIMENTS

The conveyor belt illustrated in FIG. 1 was originally manufactured with the tension-transmitting body portion defined by plies 10–13 bonded to a roughened surface material 14 of some such material as rubber or neoprene. To manufacture the cross-sectional configuration shown in FIG. 1, the initial surface of the belt was altered by machining slits along the points indicated at 15 and 16. These slits were just deep enough to cut through the tension ply 10. The presence of this tension ply in the center area facilitates the removal of the material above the ply, since the strength of the ply can be utilized to rip out the cover material between the slits 15 and 16. This procedure leaves a channel, which is then poured with an initially liquid settable material to the selected level to establish the surface 17 lying generally along the dropped article impact zone of the belt. The material used for providing the abrasion-resistant strip 18 is preferably polyurethane. A material marketed under the trademark "Adiprene" has been found satisfactory for this purpose. This material exhibits a high resistance to cutting and abrasion, together with a very low coefficient of friction with respect to the remaining article-carrying surfaces 19 and 20 on either side of the strip 18. Best results have been obtained by pouring the level of the surface 17 to a height somewhat below the plane of the tops of the material defining the surfaces 19 and 20, and yet high enough so that there will be some degree of lateral outflow along the edges of the strip 18 into the irregularities of the surfaces 19 and 20. This lateral interengagement is best shown in FIG. 2. Standard procedures recommended for the pouring and handling of the particular polyurethane can normally be followed, but it is recommended that the exposed surface of the belt against which the polyurethane is poured by machined relatively clear of bonding material between the plies so that as much contact as possible is provided between the poured material and the exposed ply 11. A pouring temperature of approximately 212°, together with a setting time of 12 to 16 hours at room temperature, or 3 hours at between 200° and 212°, appears to be satisfactory for completing the manufacture of the belt. The presence of bubbles of air entrained in the initially liquid material can frequently be removed by the gentle application of the flame of a blowtorch to the affected area.

In the preparation of the modified form of the invention illustrated in FIG. 5 wherein the articles to be dropped upon the belt are so dimensioned as to impact the same along spaced, parallel article impact zones, a tension-transmitting portion including the four plies 21—24 are initially bonded together, and the steel rails 25–26 placed in position parallel to the edges of the belt. These rails are preferably coated with a release agent to prevent bonding of the rails to the belt, as a result of possible seepage of liquid material underneath the rails. When the rails are in position, the initially liquid polyurethane is poured in the channels defined by the spaces between the rails to form the strips 27 and 28. These will naturally bond to the tension-transmitting plies, and the depth of the strips 27 and 28 can be controlled by a so-called "-screeding" operation involving the drawing of a bar along the tops of the rails 25–26. This operation will of course conform the top of the strips 27 and 28 to the plane of the tops of the rails. Subsequent removal of the rails will produce the belt configuration shown in FIG. 5.

The modification shown in FIGS. 6 and 7 has a laminated four-ply tension-transmitting portion 29 to which the abrasion-resistant edge portions 30 and 31 have been applied according to the techniques previously described. The portions 32 and 33 overhang the edges of the tension-transmitting portion, and it is desirable to prevent a point of localization of flexure at the edge of the tension-transmitting portion where a sudden change in the thickness of the abrasion-resistant material takes place. To avoid a resulting tendency for the abrasion-resistant material to break-away at the edges of the tension-transmitting portion, the laminated ply material is serrated along its edges as shown at 34 and 35. This produces areas in which the abrasion-resistant material extends for the full height of the outer edges, and thus tends to stiffen the relationship between the outside edges of the portions 32 and 33 so that a straight line of flexure parallel to the edge of the belt does not develop.

Conveyor belts constructed according to any one of the above modifications have been found to outlast normal belts (having only cushioning and traction material) by as much as six to nine times under conditions subject to heavy abrasion or cutting action. The cost of adding the abrasion resistant strips has been found to increase the total cost of the belt over its initially-manufactured condition by 60 to 75 percent, in typical cases. Obviously an increase in wear of this extent at a cost increase of this magnitude produces an immense overall saving. The polyurethane material exhibits a satisfactory bonding to the tension-transmitting portions of the belt to perform well in passing around pulleys without inducing separation. Belts of this type are commonly manufactured laid out in the flat, followed by coupling the ends together with conventional fastening devices. This technique does not require modification to accommodate the present invention. The application of the liquid into the fabric-like surface of the tension-transmitting plies causes a degree of interengagement that further inhibits any tendency to separate under flexing or application of tension.

We claim:

1. A conveyor belt including a tension transmitting body portion backing a load bearing surface; said load bearing surface having at least three zones including dropped article impact and carry zones extending longitudinally thereof; each said impact and carry zone having relatively low and high surface friction coefficients, respectively; and said tension transmitting body portion having secured thereto, in face to face engagement therewith, a strip of anti-friction material extending throughout each said impact zone having a lesser surface friction coefficient than said tension transmitting body portion.

2. The conveyor belt of claim 1 wherein said tension transmitting body portion has secured thereto, in face to face engagement therewith, a strip of friction material extending throughout each said carry zone having a higher surface friction coefficient than said strip of anti-friction material extending throughout each said impact zone.

3. The conveyor belt of claim 2 wherein the thickness of said friction material strip exceeds that of the anti-friction material strip; said friction material strip including surface irregularities in the face thereof remote from the tension transmitting body portion; and at least some of said irregularities containing anti-friction material continuous with said strip of anti-friction material.

4. The conveyor belt of claim 1 wherein said load bearing surface has two spaced, parallel impact zones extending longitudinally thereof in spaced relation to the side edges of said belt; said load bearing surface consisting of two spaced, parallel strips of anti-friction material and three spaced, parallel exposed surfaces of said tension transmitting body portion; and said parallel strips of anti-friction material extending throughout said impact zones in spaced relation to the side edges of said belt.

5. The conveyor belt of claim 1 wherein the side edges of said tension transmitting body portion are serrated; said load bearing surface having two spaced, parallel impact zones extending longitudinally thereof; said load bearing surface consisting of two spaced, parallel strips of anti-friction material and a single exposed surface of said tension transmitting body portion intermediate said anti-friction material strips; and each said anti-friction material strips overlapping and secured to a respective serrated side edge of said tension transmitting body portion.

* * * * *